United States Patent
DeLong

(10) Patent No.: US 6,247,169 B1
(45) Date of Patent: Jun. 12, 2001

(54) STRUCTURED EXCEPTION-HANDLING METHODS, APPARATUS, AND COMPUTER PROGRAM PRODUCTS

(75) Inventor: Rance J. DeLong, Los Gatos, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 08/740,802

(22) Filed: Nov. 4, 1996

(51) Int. Cl.[7] ........................................... G06F 9/45
(52) U.S. Cl. ................................. 717/4; 712/244
(58) Field of Search .......................... 717/4; 712/216, 712/244

(56) References Cited

U.S. PATENT DOCUMENTS

| | | | |
|---|---|---|---|
| 5,500,881 | * | 3/1996 | Levin et al. .................. 395/700 |
| 5,628,016 | * | 5/1997 | Kukol ........................... 395/704 |
| 5,784,613 | * | 7/1998 | Tamirisa ........................ 395/670 |

OTHER PUBLICATIONS

Boone. Java Essentials for C and C++ Programmers. Addison–Wesley Developers Press. pp. 31–32, Apr. 1996.*

* cited by examiner

Primary Examiner—Mark R. Powell
Assistant Examiner—Wei Zhen
(74) Attorney, Agent, or Firm—Beyer Weaver & Thomas, LLP

(57) ABSTRACT

A structured software exception-handling mechanism and method provides an improved paradigm for managing program flow control after error detection without requiring compiler modifications. Selected code is wrapped in one or more exception handling constructs which can be nested. Exceptions are raised and handled in accordance with specified handlers or by a default handler outside the scope of specified exception code wrappers.

19 Claims, 6 Drawing Sheets

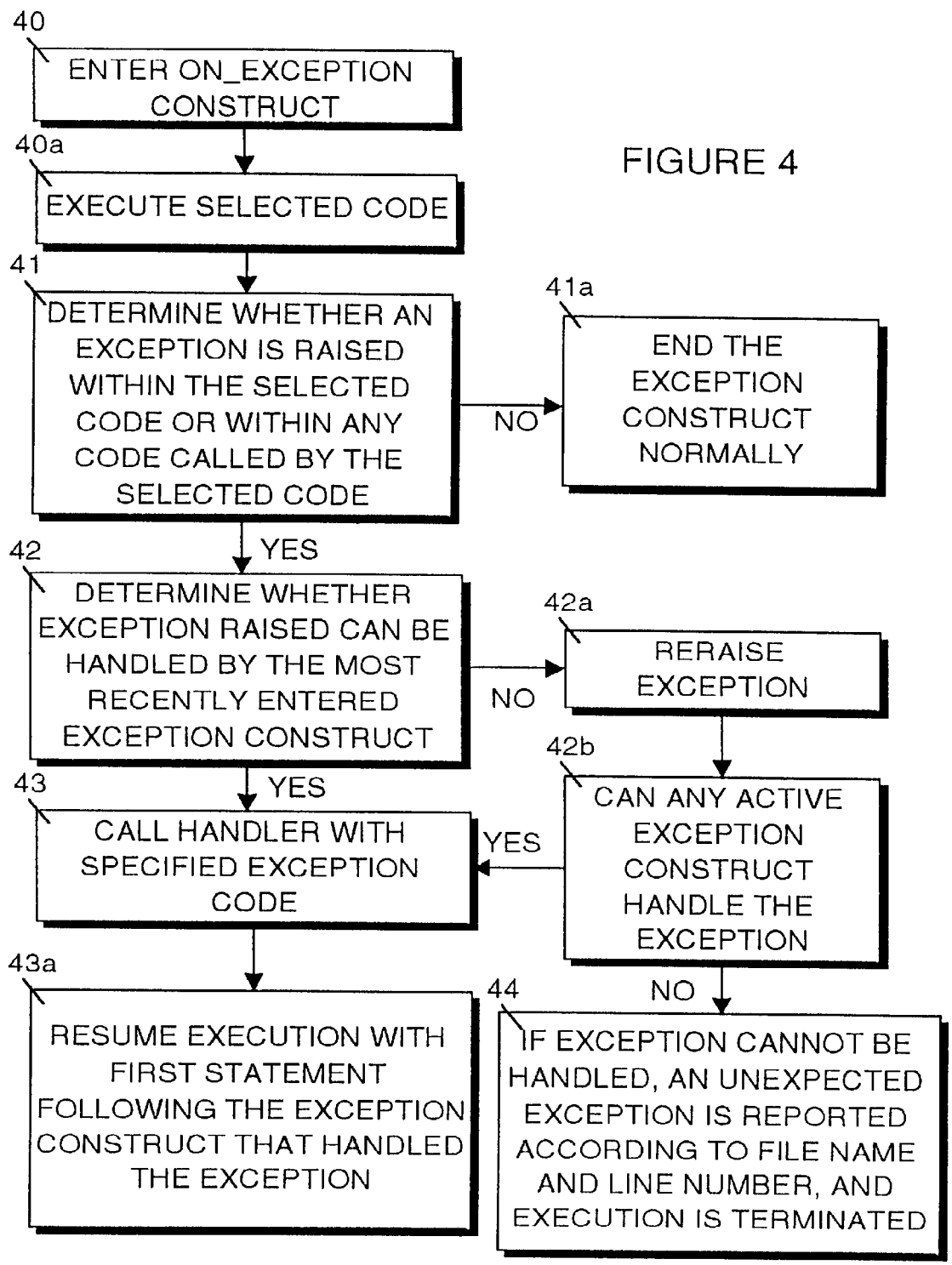

STRUCTURED EXCEPTION-HANDLING METHODS, APPARATUS, AND COMPUTER PROGRAM PRODUCTS

COPYRIGHTS IN PATENT MATERIALS

Portions of this patent document contain material subject to copyright restriction. The copyright owner has no objection to facsimile reproduction of the patent document after grant, as it appears in the U.S. Patent and Trademark Office files or records, but otherwise reserves all rights relating thereto.

FIELD OF THE INVENTION

This invention relates to the field of software and more particularly software structured exception handling mechanisms and methods.

BACKGROUND OF THE INVENTION

Since initial creation of the C programming language by Dennis Ritchie in the 1970's, considerable research and development of programming languages has produced various exception handling mechanisms. Exceptions are program flow deviations in which alternate processing deals with particular error conditions. This requires additional code to establish alternate program flows and to record error circumstances and termination of software execution. The additional code may distract software programmers reviewing main program flow, particularly if large blocks of alternate program are interspersed in the software code under review. The additional code is moreover typically implemented ad hoc in poorly drafted fashion, detracting from code readability and maintainability. While the C programming language is flexible enough to permit such ad hoc program flows, the resultant code is often obscure and defective. To test and debug such code is costly and time consuming. This creates inefficiencies in code production and fails to provide much certainty that errors and defects in new software code have actually been completely eliminated.

Cumbersome and clumsily crafted exception handling code further contributes to increased software bulk in implementing selected software functionalities. Unfortunately, clumsy and cumbersome code is prevalent and ubiquitous in software programs recently developed.

It is accordingly desirable to simplify exception handling flows in new software code. It is additionally desirable to reduce the clutter of repetitive variations of software code created for exception handling methods and mechanisms. Additionally, it is desirable to reduce the absolute number of lines of code in newly coded software. It is further desirable to simplify software error code handling, to reduce code-writing workloads for software programmers, and to permit a greater focus on quality and completeness of new software code during development. It is further desirable to simplify life cycle maintenance processes for newly developed software.

SUMMARY OF THE INVENTION

According to the present invention, an embedded exception handling software construct encapsulates at least a single selected software code region in a software program. Encapsulation of the selected code region ensures structured exception handling within the execution scope of the encapsulated software. According to one embodiment of the present invention, the range of the structured exception handling extends beyond the lexical scope of the encapsulated code and includes its run-time dynamic scope. In another embodiment of the present invention, a nested exception handling software construct services exceptions within correspondingly nested software code regions. Layered exception handling at multiple selected levels is accordingly accomplished according to the present invention. Additionally, under the present invention, a default exception handling construct responds to undefined error conditions which arise during execution.

According to the present invention, program flow control is implemented with a software construct triggered by identification of an error condition. In particular, according to the present invention, possible errors (i.e., "error conditions") are identified by predetermined values and reported using primitives called during program run-time.

The exception handling mechanism according to the present invention particularly reports the file and line number at which an exception occurs, directly identifying bug locations without time-consuming error location efforts. Further, the software developer is saved from having to determine which of many potential program exits have been taken during program execution. The handling and reporting of exceptions, according to the present invention, is additionally distributed over several handlers to facilitate coding, error reporting, and error recovery. According to yet another embodiment of the present invention, exception reporting and handling functions are grouped locally or remotely to optimize processing operation and increase code perspicuity.

The present invention accordingly provides an alternative to ad hoc program control flow management upon error detection. The structured exception-handling mechanism of the present invention further operates in the C programming language without requiring compiler modifications.

BRIEF DESCRIPTION OF THE DRAWINGS

FIG. 4 is a second flow chart according to a method of the present invention illustrating processing which is performed by the exception-handling mechanism.

DETAILED DESCRIPTION OF A PREFERRED EMBODIMENT

Figure 1A:
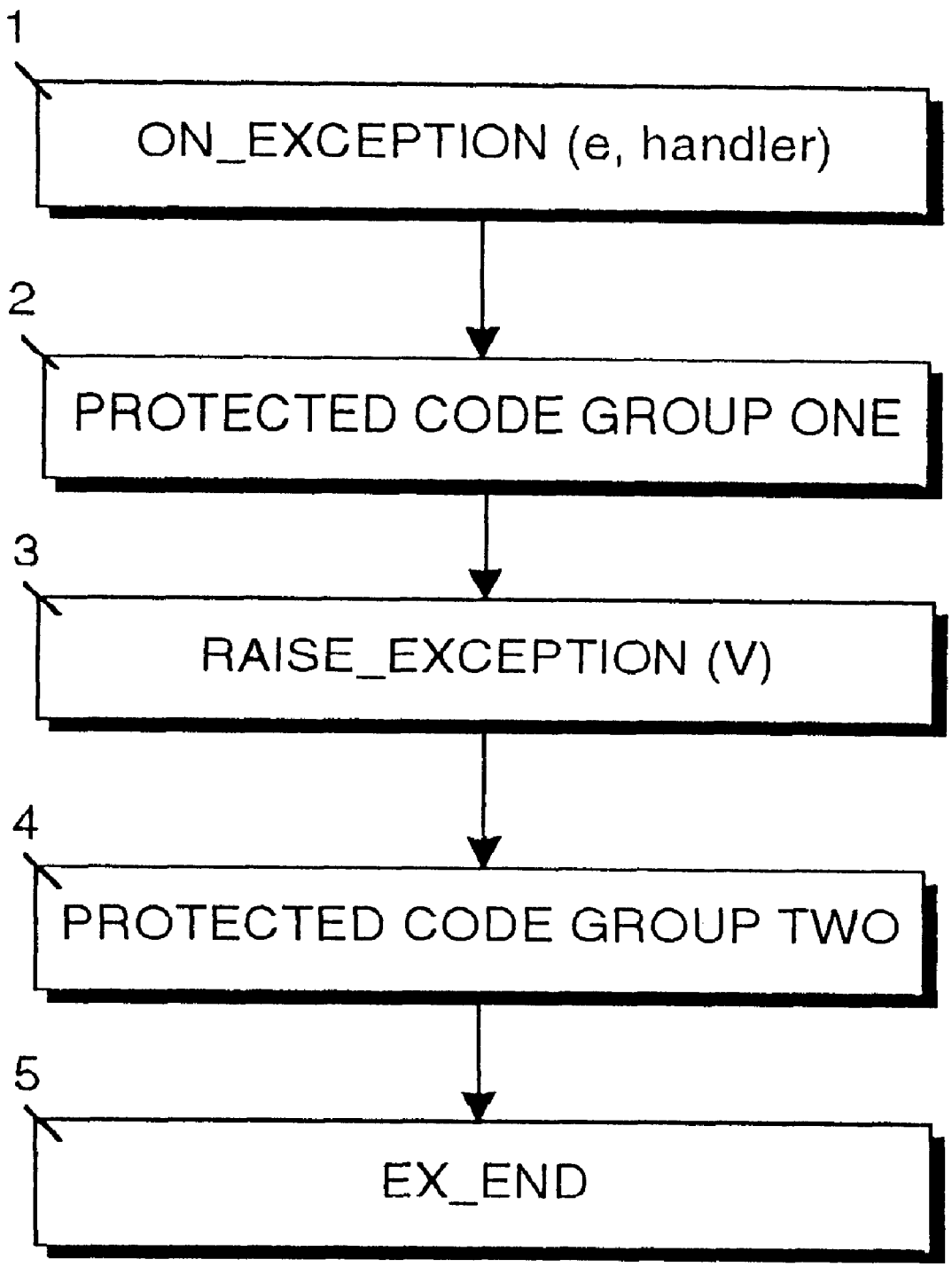
FIG. 1a is a first flow chart of a method according to the present invention.

FIG. 1a is a flow chart of a method according to the present invention engineered for standardized software exception handling. According to one embodiment of the present invention, standardized software exception handling can be implemented and utilized as demonstrated in the following pseudocode example:

```
int e;
void (*handler) ( int exception_code ) ;
ON_EXCEPTION(e , handler ) {
        . . . protected code group one . . .
            RAISE_EXCEPTION( v ) ;   /* often invoked in
                                        deeply nested calls */
        . . . protected code group 2 . . .
}EX_END;
```

The first expression in the above pseudocode according to the present invention is a variable declaration "int e." The variable "e" is an argument of the ON_EXCEPTION macro. The function "handler" is another argument of the ON_EXCEPTION macro and depends on the integer variable "exception_code." Variable "e" is declared to be an integer variable. The expression "*handler" is a pointer to a function that returns no value. "ON_EXCEPTION" is a function of the integer variable "e" and the handler function. RAISE_EXCEPTION represents specific exception handling code according to the present invention, in accordance with the RAISE_EXCEPTION macro definition in Appendix A.

FIG. 1a shows the general flow of a software code construct according to the present invention, for enveloping or wrapping a selected body of code, referred to as protected code. According to a method of the present invention, ON_EXCEPTION code is run 1. Then, a first portion of protected code is run 2. The protected code includes first and second groups of code, e.g., group one and group two. Next, particular RAISE_EXCEPTION code defined by integer "v" is run 3. Next, according to one embodiment of the preset invention, a second group of code which follows raising the exception is run 4. Finally, EX_END code is run 5. Additional embodiments are detailed below and particularly in connection with FIG. 4. The code shown in groups one and two is standard C code including first and second macro expressions "ON_EXCEPTION" and "EX_END." A well-known C preprocessor replaces the macro expressions with code provided in Appendix A. This invention also applies to other kinds of codes including but not limited to C++ or Java. The indicated first and second macro expressions mark the beginning and end of the protected code. Macro EX_END provides code complementary to ON_EXCEPTION to define the end of the software code within the protective exception handler construct in accordance with the present invention.

Figure 1B:
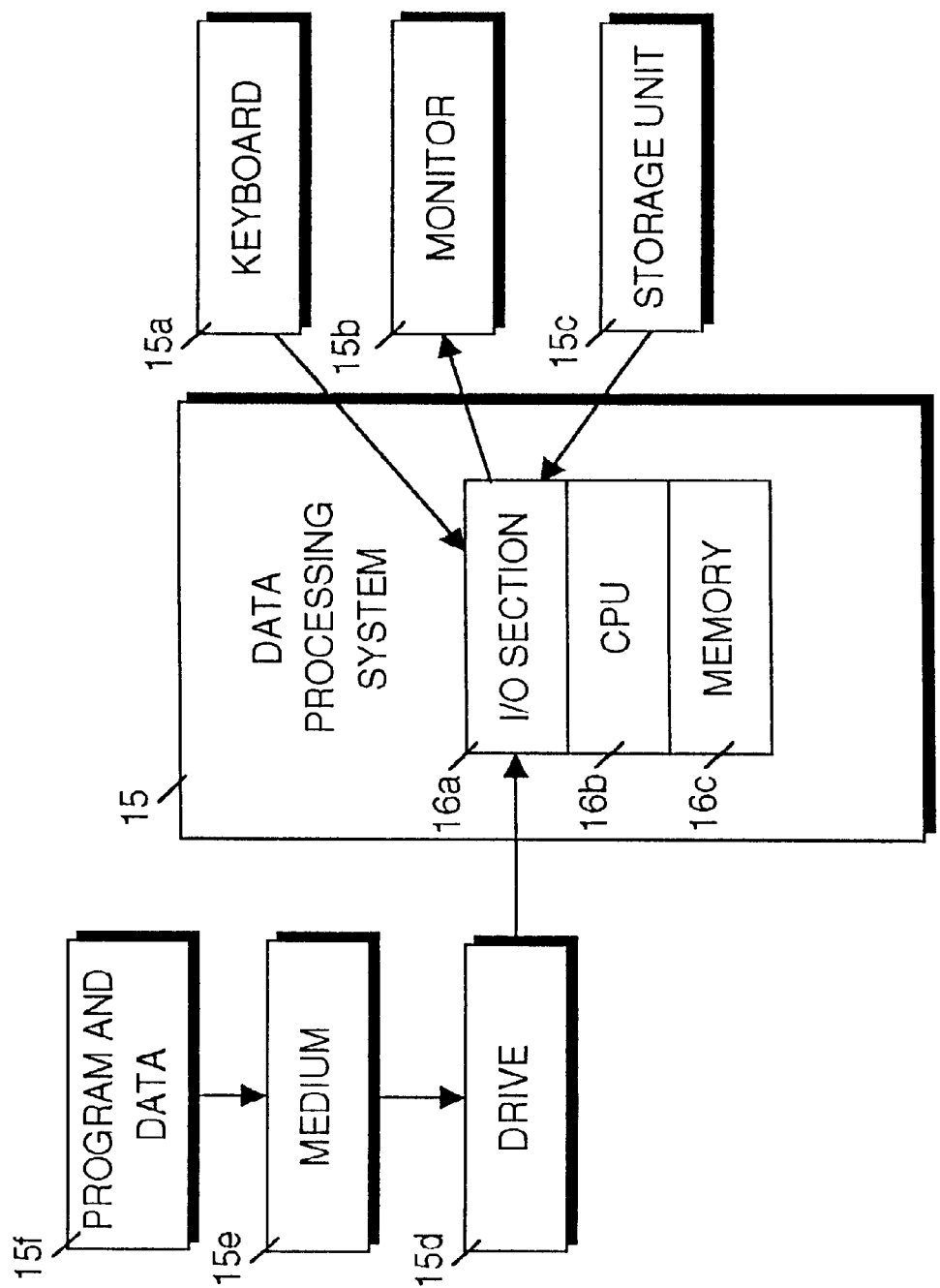
FIG. 1b is a block diagram of a known data processing system on which software according to the present invention can be implemented.

FIG. 1b is a block diagram of a data processing system 15 on which software according to the present invention can be implemented. Data processing system 15 particularly includes an input/output (I/O) section 16a, a central processing unit (CPU) 16b, and a memory section 16c. CPU 16b receives information for data processing from memory section 16c and from input/output section 16a. Connected to input/output section 16a are a keyboard 15a, a monitor 15b, a storage unit 15c, and a drive 15d for operating a medium 15e encoded with a computer program and associated data 15f in accordance with the present invention. Storage unit 15c may be a mass storage unit for data such as a magnetic disk or optical storage device. Drive 15d can be a computer program product reader such as a floppy disk, optical drive, or a CD-ROM drive. Medium 15e can be a magnetic or optical medium for storing information readable by drive 15d. CPU 16b may run an operating system such as a Sun Microsystems Solaris operating system. The operating system can be loaded on memory 16c or storage unit 15c or on a combination thereof, to provide instructions for CPU operations. Software according to the present invention is written on medium 15e according to one embodiment of the present invention. The software is provided to storage unit 15c and/or memory section 16a by inserting medium 15e into drive 15d and installing the software in applicable memory locations of storage unit 15a and/or memory section 16a.

Figure 1C:
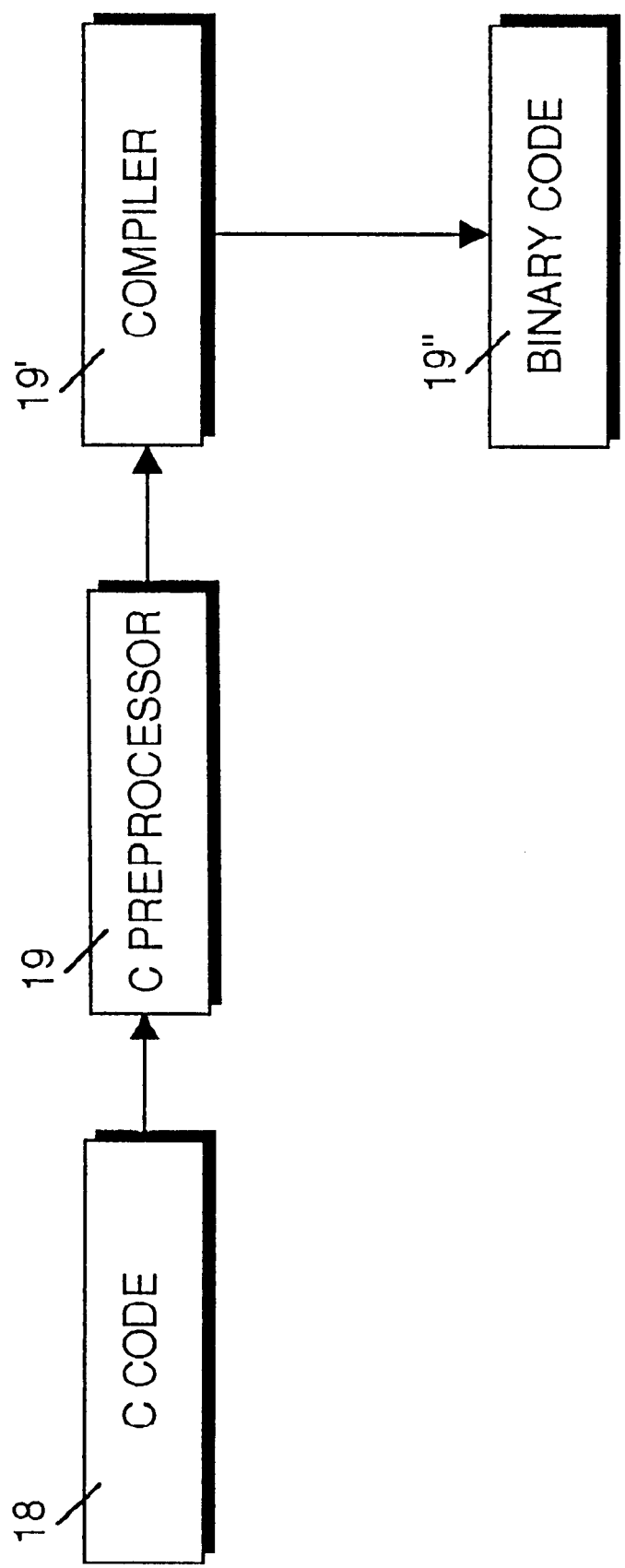
FIG. 1c is a system for converting C Code into binary code using a C preprocessor and a compiler according to the prior art.

FIG. 1c is a system for converting C code 18 into binary code 19" using a C preprocessor 19 and a compiler 19' according to the prior art. Compiler 15 is suitably configured according to well-known techniques to read selected C code according to the present invention which is provided by a user, into memory 16c for preprocessing with C preprocessor 19 and compiling with compiler 19' to produce binary code.

Figure 2:
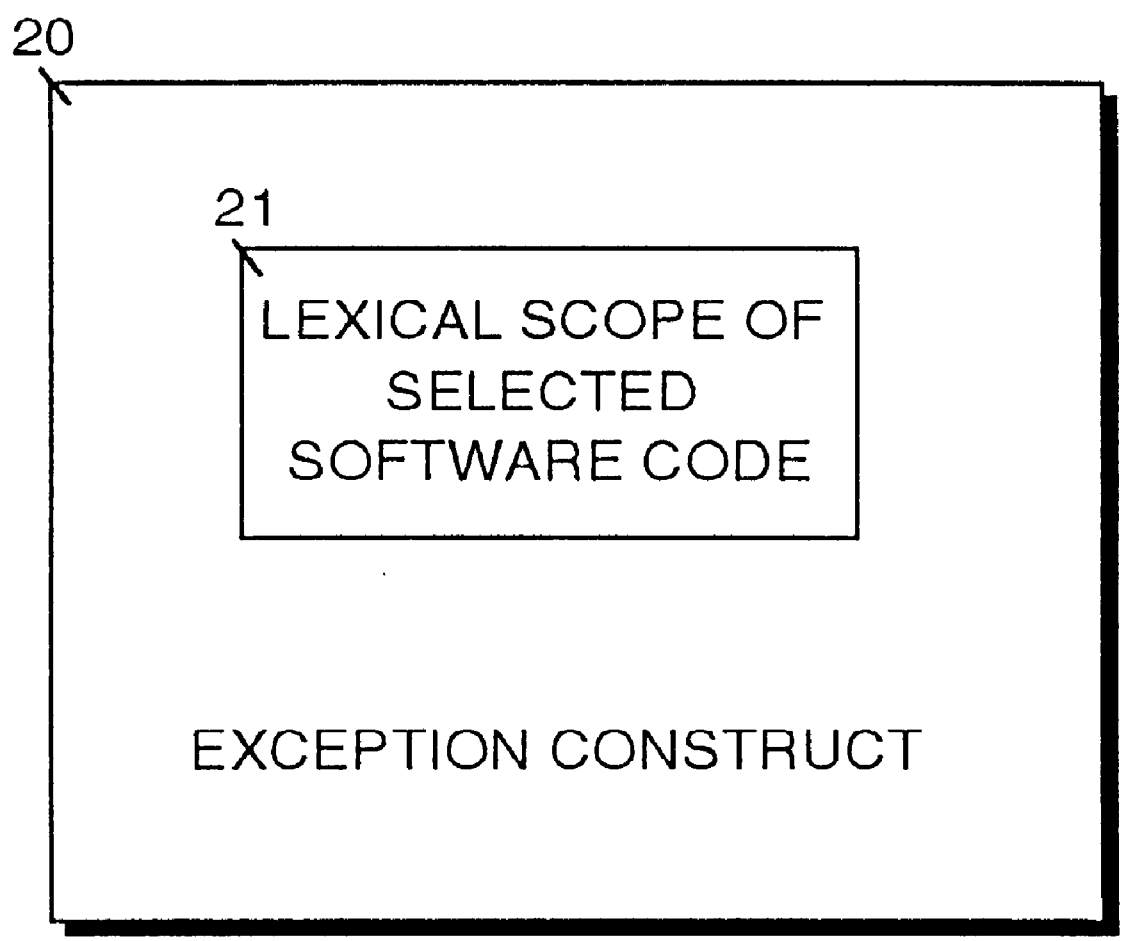
FIG. 2 is a block diagram of an exception wrapper construct according to the present invention, in which the exception construct wrapper is wrapped around selected software code.

FIG. 2 is a block diagram of an exception construct 20 according to one embodiment of the present invention. Exception construct 20 is an embedded-code-enclosing wrapper enveloping the lexical scope 21 of selected software code to be protected. In particular, exception construct 20 is placed around a selected section of software code within which an applicable exception may be raised. The wrapper of exception construct 20 includes an opening expression, "ON_EXCEPTION (e,handler) {"and a closing expression"}EX_END". The opening expression of exception construct 20 is inserted at the beginning of the lexical code scope 21 of the selected software. The closing expression of exception construct 20 is inserted at the end of the lexical code scope 21 of the selected software. The opening expression and the closing expression represent individual macros which are expanded according to one embodiment according to the macro definitions in Appendix A by action of C preprocessor 19 indicated in FIG. 1c. The braces of the opening expression and the closing expression enclose the selected code which is subject to protection according to exception construct 20 of the present invention.

Figure 3:
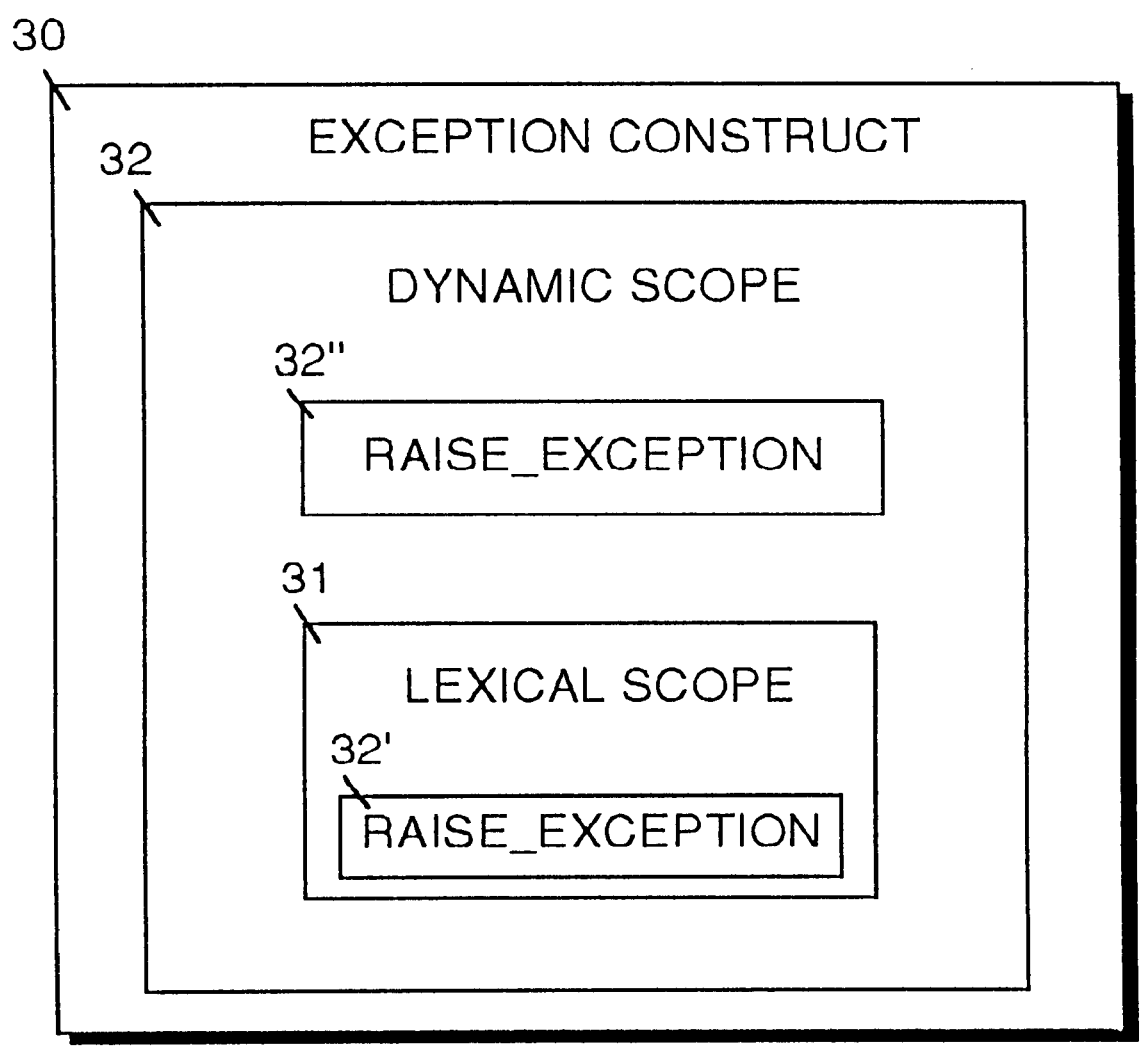
FIG. 3 is a diagram showing the scope of the exception construct wrapper in accordance with an embodiment of the present invention, including both lexical scope and dynamic scope.

FIG. 3 is a diagram showing the scope of an exception construct 30 in accordance with an embodiment of the present invention, including both lexical code scope 31 and dynamic code scope 32. Lexical code scope 31 includes the code scope of a sequence of lines of code as read by a human reviewer including first RAISE_EXCEPTION code 32'. Dynamic code scope 32 includes the sequence of code as actually run during computer processing including both first RAISE_EXCEPTION code 32' and second RAISE_EXCEPTION code 32". Dynamic code scope 32 thus includes lexical code scope 31. The total effective scope of exception construct 30 is accordingly its lexical code scope 31 and the dynamic code scope 32 as bounded by an ON_EXCEPTION expression and its termination at an EX_END expression. The enclosed software code within this dynamic scope responds in predetermined fashion until the raising of a particular exception occurs. Raising an exception means invoking a particular exception handler as specified by a RAISE_EXCEPTION macro. The only restriction on protected code within the lexical or dynamic code scope is that the particular protected code cannot branch out of the established range of the ON_EXCEPTION block and that no called code within the protected block can execute a non-local goto, other than RAISE_EXCEPTION code, according to the present invention. This prevents transfer of control out of the code lexically or dynamically contained within exception construct 30. This restriction is, in practice, not a hindrance because it is in keeping with accepted good practice.

Code enclosed within exception construct 30 of FIG. 3 is executed independent of its status of being wrapped within an ON_EXCEPTION block, according to the present invention. In particular, according to the present invention, when computer processing enters an ON_EXCEPTION construct covering selected computer code, the code is executed as though it were not within exception construct 30. Being within exception construct 30 means that determination is made whether an exception is raised within the selected code or within any code called by the selected code. If no exception is raised within the indicated code, then processing within the exception construct is continued and finally ended according to normal code processing of the wrapped code. If an exception is raised and can be handled by the most recently entered exception construct, then the exception handler identified by the exception construct will be invoked. On the other hand, if the exception raised cannot be handled by the most recently entered exception construct, the exception is reraised and a determination is made whether any enclosing active exception construct is available to handle the particular exception. If an active exception construct is available or if the exception raised can be handled by the most recently entered exception construct, then the handler is called with the specified exception code. If there is no active exception construct which can handle the exception, then an unexpected exception is reported according to file number and line number, and execution is terminated.

In summary, if an exception is raised anywhere within an enclosed block or within any code called within a protected block, then further execution within the enclosed block will cease, unless the exception is handled by another ON_EXCEPTION block nested within the first ON_EXCEPTION block. The exception mechanism will ascertain whether the specific exception raised can in fact be handled by the handler designated by the ON_EXCEPTION block. If the exception can be handled by the designated handler, that handler is called by the exception code. Otherwise, the exception is automatically re-raised, giving an enclosing ON_EXCEPTION block the opportunity to handle the exception. If the exception does not correspond to kinds of exceptions which can be handled by any active ON_EXCEPTION block, then the default exception handler reports that an UNEXPECTED EXCEPTION occurred during execution at the particular place in the code identifying it by file and line of occurrence and exits.

The exception mechanism according to the present invention particularly avoids certain unfortunate code redundancies prevalent in many state-of-the-art software programs. A pseudocode example of such code which is typically repeated in varied forms follows:

```
if( ... <bad thing> ... ) {
    ...
    <generate error messages>
    ...
    <set error status values>
    ...
    <cleanup program environment, e.g.: files, etc.>
    ...
    exit(<error status value>);
}
```

Such code may reappear multiple times when an exception circumstance is encountered during a conventional program run. The conventional exception code often includes multiple unstructured variations. When such ad hoc code sequences proliferate excessively and unnecessarily in programs and libraries, the resulting code package becomes extremely bulky.

The present invention accordingly provides consistency and compactness of a disciplined code structure for handling exceptions, according to the following paradigm:

```
if( ... <bad thing> ... )
    RAISE_EXCEPTION(VERIFICATION,BadThing);
``` where this statement occurs somewhere within the dynamic scope of:

```
ON_EXCEPTION(VERIFICATION,verify_class_
    excp_handler){
    ...
}EX_END;
``` where VERIFICATION is a class of exception, and BadThing is a constant or an expression representing a specific exception within the VERIFICATION class, or indicating multiple simultaneous exception conditions, such as in the form:

(VerBad1|VerBad2| ... |VerBadN)

where VerBad1, VerBad2, et seq. are specific exceptions within the verification class.

Use of the indicated exception handling constructs permits elimination of code clutter caused by repetitive lines of ad hoc exception handling code This reduction in code clutter causes increased programmer productivity, in part because the programmer has less lines of code to write. The programmer further has fewer lines to read and scroll through during review or revision. It is further very convenient and practicable to write code with embedded exception handling constructs in accordance with the present invention. This reduces the temptation for a programmer to disregard potential error conditions and "bugs". The exception mechanism according to the present invention further simplifies software production by reporting the file and line of origin of each exception. This allows a programmer rapidly to reach problem code, without having to determine which of many program exits were taken. With possible repetitive exception occurrences in several libraries and software program locations, large numbers of such occurrences are possible, providing multiple potential exit points from a selected program. In some current software code, distinct exit numbers enable tracking the exit taken. According to an embodiment of the present invention, the handling and reporting of exceptions is subject to centralization in a single handler routine, substantially facilitating software coding, maintenance, and review. Further according to one embodiment of the present invention, the grouping of exception reporting and handling at selected central locations is accomplished.

A handler according to one embodiment of the present invention includes the following lines:

```
verify_class_excp_handler(int exception_type) {
    switch( exception_type ) {
        case VerBad1: ...
        case VerBad2: ...
        ...
    }
}
```

The exception handler mechanism, according to one embodiment of the present invention, is invoked by executing a statement such as:

RAISE_EXCEPTION (VERIFICATION, VerBad2), where the second argument to RAISE_EXCEPTION is a single value rather than a bit mask expression.

In the case that the second argument is a bit mask, handler code according to the following embodiment is provided:

```
verify_class_excp-handler(int exception_set) {
    int e;
    for (  e = FIRST (VerifyExcps) ;
           e<=LAST (VerifyExcps) ; e++ )
            if ( member ( e, exception_set ) )
                switch ( e ) {
                case VerBad1: . . .
                case VerBad2: . . .
                . . .
                }
}
```

Definitions of particular macros that implement the exception-handling mechanism at run-time, according to an embodiment of the present invention, are shown in Appendix A for a C preprocessor (CPP) which expands selected software code with macro declarations before compilation into machine language. These macros define the key words used to invoke the exception-handling mechanism in writing application programs. These definitions are contained in a header file which, according to the present invention, is named "exceptions.h" and is provided in Appendix A. It is the action of the C preprocessor in expanding these key words according to the definitions in exceptions.h that generates the C code that implements the operations implicit in the use of the exception-handling mechanism. The resulting C code is acceptable to the C compiler, or acceptable upon completion of substitution by the C preprocessor. Thus, implementation of the exception-handling mechanism is achieved with no modifications to the C compiler. The bodies of the CPP definitions of the key words of the exception-handling mechanism internally make use of two additional components described below.

The C library primitives setjmp( ) and longjmp( ) are a primitive facility for non-local goto in C programs. These primitives may be implemented as functions, macros, or intrinsics recognizable by the compiler. The setjmp( ) primitive saves its stack and register environment in a data structure called a jmp_buf which occupies programmer supplied storage. These primitives are used by the exception-handling implementation, without the user being aware of the use of setjmp( ) and longjmp( ) in the implementation.

A run-time stack of jmp_buf structures is referred to as the exception scope stack. This stack, like the use of setjmp( )/longjmp( ), is hidden from the user of the exception-handling mechanism. The stack discipline for maintaining jmp_buf structures provides the dynamic scoping behavior of the exception-handling mechanism, and permits nesting of those scopes.

During the execution of a program using the exception-handling mechanism, entry to any ON_EXCEPTION construct includes a call to setjmp( ) and the subsequent pushing of the resulting jmp_buf structure on the exception scope stack. Exit from the exception construct includes popping the corresponding jmp_buf structure from the exception scope stack. Any RAISE_EXCEPTION operation entails a transfer of control to the environment specified in the dynamically innermost ON_EXCEPTION construct as its exception handling code. This transfer is achieved by popping the topmost jmp_buf structure from the exception scope stack and by performing a longjmp( ) using that jmp_buf as an argument. The process continues until an ON_EXCEPTION construct is encountered that can handle the particular exception value. If none can be found, an "UNHANDLED EXCEPTION" condition is reported.

When an ON_EXCEPTION construct is entered 40 according to FIG. 4, a predetermined exception environment is established. If an exception is raised, a determination is made 42 whether the particular exception can be handled by the currently active exception environment. If the exception cannot be handled, the exception is re-raised 42a, and an iterative process determines whether there is any stacked exception environment that can handle the particular exception. If the exception can be handled, an applicable handler is called 43 to process the handling with specified exception code. Upon return from the exception handler, execution is resumed, according to one embodiment, with the first statement following the exception construct that handled the exception. If the exception cannot be handled by any exception environment, an unexpected exception is reported 44 according to file name and line number, an error is reported, and an exit from execution is made 44. The use of line numbers rather than exit numbers is preferred because exit numbers may be inadvertently duplicated, misleading the software engineer as to the location of a defect. Hours and days can be wasted in looking for an error at a location erroneously identified by a duplicate error number. In particular, according to the present invention, a block of code that is entered through ON_EXCEPTION is exited through EX_END. The code in this dynamic scope is protected from the occurrence of the designated exception. A restriction upon the protected code is that it not branch out of the ON_EXCEPTION block and that no called code executes a non-local goto, other then RAISE_EXCEPTION, which would effectively result in a transfer out of the code lexically contained within the ON_EXCEPTION . . . EX_END construct or out of the protected code in the dynamic scope of the construct. In the normal case, the enclosed code will be executed as though it were not wrapped in the exception wrapper. However, if any exception is raised within the enclosed block or within any code it calls, then execution of the enclosed block is interrupted (provided that the exception is not handled by another nested ON_EXCEPTION block). Then, the exception mechanism ascertains whether the specific exception raised can be handled by the handler designated by the ON_EXCEPTION block; if so, that handler is called with the specific exception code; otherwise, the exception is re-raised, giving an enclosing ON_EXCEPTION block the opportunity to handle the exception. If the exception does not correspond to that handled by any active ON_EXCEPTION block, then the default exception handler reports that an UNEXPECTED EXCEPTION occurred at a particular file and line and reports an error and exits.

An additional embodiment of the exception handling construct according to the present invention is shown with reference to Appendix D. As shown in the appendix, exceptions are raised within both the lexical as well as within the dynamic scope of the exception handling construct. In particular, a first function call, func1, is made within the lexical scope of a first ON_EXCEPTION construct. Another function call, func2, is made within the scope of the first function call. Three exceptions are raised, one within the scope of the first exception handling construct, another within the first function code and outside the lexical but within the dynamic scope of the first exception handling construct, and a third within the second function code and within the dynamic scope of the first exception handling construct. Notably, the lexical scope of the first exception construct includes a second exception construct nested within it. In fact, the first function call is code encapsulated or wrapped within the second exception construct. Two kinds of exceptions are defined, EXC_SETUP and EXC_ARG; a third exception is undefined, EXC_PROGRAM.

Thus, when the EXC_ARG exception is raised in func2, it is handled within the nested, inner exception construct ON_EXCEPTION_H (EXC_ARG, h). When EXC_PROGRAM is raised in func1, an attempt is made at handling the exception within the successive nested exception constructs, but unsuccessfully, because there is no corresponding construct which calls an associated handler. However, in accordance with an embodiment of the present invention, a default exception handling construct is provided in the preprocessable macro INIT_EXCEPTION. One embodiment of the INIT_EXCEPTION macro is expressed in both Appendix A and Appendix E. Its expression in Appendix A is in the form of a macro definition, and its expression in Appendix E is provided as part of an expanded version of an example of preprocessed code provided in Appendix D. The code shown in Appendix E is the result of running the example code of Appendix D through a "C" preprocessor.

As shown in FIG. 1a and in Appendix D, ON_EXCEPTION constructs according to the present invention can be nested lexically and dynamically to enable their insertion within the scope of other ON_EXCEPTION constructs. Further, occurrences of RAISE_EXCEPTION can occur within either the dynamic or lexical scope of an ON_EXCEPTION, as shown in FIG. 3. The nearest or innermost layer ON_EXCEPTION which encloses a RAISE_EXCEPTION invocation will field the exception, followed successively by further enclosing ON_EXCEPTION constructs within which the nearest or innermost construct is nested. A topmost initialization of the exception handling mechanism is provided to catch otherwise unhandled exception conditions, as discussed above.

APPENDIX A

MACROS FOR EXCEPTION HANDLING

```
/*
 *
 y@ (#) exception.h 1.8 94/05/31 SMI; SunOS CMW
 *    Name:      exception.h
 *
 *    Description:  Macros to implement exception handling control
 structure
 */
#ifndef __exception_h
#define __exception_h
#include <setjmp.h>
/* exception classes: */
#define EXC_SETUP        1
#define EXC_OPERATION    2
#define EXC_VERIFY       3
#define EXC_LIB          4
#define EXC_TEST_PROG    5
/* SETUP class exception types */
#define SUP_INC_TEST_PARAMS      0x0001 /* incomplete test params */
#define SUP_CONDITION_CLASH      0x0002 /* test conditions clash */
#define SUP_CONDTIION_FAILURE    0x0004 /* can't establish conditions */
#define SUP_ERROR_DURING_SETUP         0x0008 /* generic setup failure
*/
#define SUP_INVALID_SETUP_PARM         0x0010 /* generic setup failure
*/
/* OPERATION class exception types */
#define OPR_PRIV_BRACKET         0x0001 /* can't set or reset privs */
#define OPR_CANT_HAPPEN          0x0002 /* should NEVER happen, but did*/
/* VERIFY class exception types */
#define VER_NOT_EXPECTED_ERROR         0x0001 /* actual err not exp err
*/
#define VER_ERROR_NOT_EXPECTED         0x0002 /* no error was expected
*/
#define VER_SUCCESS_NOT_EXPECTED       0x0004 /* success when err expected */
#define VER_NOT_EXPECTED_RESULT        0x0008 /* generic result check
fail */
#define VER_ERROR_DURING_VERIFY        0x0010 /* generic can't verify
fail */
/* the following two VER_ provided for completeness, but usually not RAISED
*/
#define VER_ERROR_AS_EXPECTED          0x0020 /* actual err is exp err */
#define VER_SUCCESS_AS_EXPECTED        0x0040 /* no actual err and none
exp */
#define VER_CANT_RESTORE_STATE         0x0080 /* can't reestablish
original */
#define VER_ERROR_DURING_CLEANUP       0x0100 /* generic can't cleanup fail */
/* TEST PROGRAM class exception types */
#define TST_PRG_ERROR_DURING_AUX       0x0001 /* generic error during aux fn */
#define TST_PRG_TEST_CASE_FAILURE      0x0002 /* generic test case fail */
#define EX_CLASS (e)   ((e) & 0xFFFF)
#define EX_TYPE (e)        ((e) >>16)
#define MAX_ENV_DEPTH 20
int exception_initialized;
int ex_envptr;
jmp_buf ex_envstack [MAX_ENV_DEPTH] ;
```

APPENDIX A-continued

MACROS FOR EXCEPTION HANDLING

```
char *excp_file;
int excp_line;
int excp_errno;
void excp_gh ( /* int exception */ ) ;
#define INIT_EXCEPTION \
    { \
        int v; \
        if( v = setjmp (ex_envstack [ex_envptr = 0]) ) { \
            excp_gh (v) ; \
            errno = 0; \
            tprintf (ERROR, "UNHANDLED EXCEPTION (last exception reported) \n") ; \
            exit (1) ; \
        } else { \
            ex_envptr++; \
            exception_initialized = 1; \
        } \
    }
#define ON_EXCEPTION_H( e , handler ) \
    for (;;) { \
        int ex_val; \
        if( ex_val = setjmp ( ex_envstack [ex_envptr++] ) ) { \
            if( e == EX_CLASS (ex_val) ) { \
                (*handler) (ex_val) ; \
                break; \
            }else \
                longjmp(ex_envstack [--ex_envptr] ,ex_val) ; \
        }else{
#define ON_EXCEPTION ( e ) \
    for (;;) { \
        int ex_val; \
        if( !(ex_val=setjmp( ex_envstack[ex_envptr++] )) ) {
#define EX_HANDLER \
        }else \
            if( e != EX_CLASS(ex_val) ) \
                longjmp(ex_envstack[--ex_envptr] ,ex_val); \
            else { \
                int ex_type = EX_TYPE(ex_val) ;
#define EX_END \
        } \
        ex_envptr--; break; \
    }
#define RAISE_EXCEPTION ( c ) RAISE_EX_C( c )
#define RAISE_EX_C( c ) \
    { excp_file = __FILE__; excp_line = __LINE__; \
      excp_errno = errno; \
      longjmp( ex_envstack [--ex_envptr] , c ) ; }
#define RAISE_EX_CT( c, t ) \
    { excp_file = __FILE__; excp_line = __LINE__; \
      excp_errno = errno; \
      longjmp( ex_envstack [--ex_envptr] , (t<<16) | c ); }
#endif /* _exception_h */
```

APPENDIX B

MANUAL PAGE

ON_EXCEPTION_H (3)    C LIBRARY FUNCTIONS
NAME
    ON_EXCEPTION_H - macros for exception handling
SYNOPSIS
```
        #include "exception.h"
        int e;
        void (*handler) ( int exception_code ) ;
        ON_EXCEPTION_H(e , handler) {
           ... protected user code
           RAISE_EXCEPTION( v ) ;   /* possibly (probably) in called code */
           ... protected user code
        }EX_END;
        ON_EXCEPTION(e) {
           ... protected user code
           RAISE_EXCEPTION( v ) ;   /* possibly (probably) in called code */
```

APPENDIX B-continued

MANUAL PAGE

```
        ... protected user code
    }EX_HANDLER{
        ... exception handling code (may reference ice9_ex_val or
ice9_ex_type)
    }EX_END;
    int EX_CLASS(e)
    int EX_TYPE(e)
    RAISE_EX_C(class)
    RAISE_EX_CT(class, type)
```

DESCRIPTION

Exception constructs can by nested (statically or dynamically) and the occurrences of RAISE_EXCEPTION need only be in the dynamic scope of an exception construct. The "nearest" enclosing exception construct will first field the exception, followed by one enclosing IT, etc. The topmost initialization of the mechanism provides for catching otherwise unhandled exceptions.

In the second form, where the handler code is co-located with the protected block of code, the exception handling code may reference the variables ex_val or ex_type to get the entire exception value (both class and type) or the exception type alone.

The macros EX_CLASS ( ) and EX_TYPE ( ) return the class and type (respectively) of the argument exception value.

The two forms of exception raise statements permit class-only and typed exceptions to be raised. The first is the same as RAISE_EXCEPTION( ).

EXAMPLES:

See the files demo_exceptions.sh (which uses demo_exceptions.c) ; also exceptions.h and exceptions.c.

DESCRIPTION:

The exception construct is a wrapper you place around a section of code. The scope of the exception wrapper is the lexical scope of the exception construct and the dynamic scope bounded by the entry to ON_EXCEPTION (_H) and by exiting the block of code through EX_END. This implies that the enclosed code should not branch out of the exception construct and that no called code should execute a non-local goto (other then RAISE_EXCEPTION) which would effectively result in a transfer out of the section of code lexically contained within the exception construct.

In the normal case the enclosed code is executed just as though it were not wrapped in the exception wrapper. However, if any exception is raised anywhere within the enclosed block or within any code it calls, then execution of the enclosed block will be abandoned (provided that the exception is not handled by another nested ON_EXCEPTIONblock). Then the exception mechanism ascertains whether the specific exception raised can be handled by the handler designated by the ON_EXCEPTION block; if so, that handler is called with the specific exception code; otherwise, the exception is re-raised, giving an enclosing ON_EXCEPTION block the opportunity to handle the exception. If the exception does not correspond to that handled by any active ON_EXCEPTION block, then the default exception handler reports that an UNEXPECTED EXCEPTION occurred at such-and-such file and line and reports an error and exits.

In practice this structuring mechanism is quite natural and addresses a deficiency of C by providing an alternate to the cumbersome and ad hoc means commonly used to manage the control flow of a program after and error has been detected. For icenine, specifically, the exception mechanism provides a means to avoid, for example, the following pattern commonly repeated in icenine test programs I have inspected:

```
            if( ... <bad things> ... ) {
                ...
                errno = 0;
                mesg.type = ERROR;
                cmw_mesg (&mesg) ;
                mesg.type = STATUS;
                mesg.string = "...";
                cmw_mesg (&mesg) ;
                ...
                cmw_end ( ) ;
                exit (1) ;
            }
```

This construct may be found not only in test programs and

APPENDIX B-continued

MANUAL PAGE their associated functions (~50 occurrences in a test directory chosen at random, lfs), but also in some icenine library functions (not less than 40 occurrences in the icenine library). With an estimated average of 8 lines per occurrence, 50 such occurrences comprise approximately 400 of the 1400 lines of C code in the lfs directory.
The alternative is:

```
        if( . . . <bad thing> . . . )
                RAISE_EX_CT(EXC_VERIFY,BadThing) ;
``` where all this statement occurs somewhere within the dynamic scope of:

```
        ON_EXCEPTION_H(ICE9_EXC_VERIFY,verify_class_excp_handler) {
            . . .
        } EX_END;
``` where EXC_VERIFY is a class of exception, and BadThing is an expression (*usually* just a constant but could be an expression of the form:

```
        (VerBad1|VerBad2| . . . |VerBadN) to indicate multiple
``` simultaneous exception conditions) which gives the specific exception within the EXC_VERIFY class.
By using the exception mechanism rather than the ubiquitous icenine construct we have just eliminated hundreds of lines (a substantial percentage of the code). In a very real and practical sense, this reduction in bulk translates into a gain in programmer productivity for several reasons:

1. There are fewer lines to write.
2. There are fewer lines to read and find your way through when it is necessary to read the program (of course programs never need to be read after they are written!).
3. The exception mechanism reports the file and line of origin of the exception, allowing you to go straight to the problem area, rather than having to determine which of many program exits were taken (keep in mind that with 48 occurrences in the library and several in each test program, there could realistically be 10's of such occurrences providing potential exit points from the program). (I have been informed, for example, of test programs that use distinct exit numbers so that you can track down the exit ( ) that was taken; good idea, problem is that there is at least one known instance where the exit number was inadvertently duplicated and the test/debug engineer spent an afternoon examining the wrong block of code trying to figure out what was going on. Getting a line number is better.)
4. The handling and reporting of all exceptions can be centralized in one handler routine, thereby facilitating coding, maintenance, and reading.

Item 4 identifies the side benefit that we can now group all the exception reporting and handling in one place. Following is an example of a possible handler which handles all classes of exceptions:

```
        excp_handler (exception_value) int exception_value; {
                switch ( EX_CLASS (exception_value) ) {
                case class1: . . .
                . . .
                }
        }
```

In this case, perhaps, only classes are used, or the cases within the shown switch may have subcases to handle the exception types associated with each class.
It may be more convenient to have distinct handlers for each class, as illustrated by the following:

```
        verify_class_excp_handler (exception_value)
                int exception_value;
        {
                int e;
                int types = EX_TYPE (exception_value) ;
                for (   e=FIRST (VerifyExcps) ;
                        e<=LAST(VerifyExcps) ; e++ )
                    if ( member( e, types ) )
                    switch ( e ) {
                    case VerBad1: . . .
                    . . .
                    }
        }
```

Note that the preceding example exploits that exception types may be defined as bit mask values, such that more than

APPENDIX B-continued

MANUAL PAGE one might be set at a time. If the exception mechanism is used in such a way that exception types are exclusive values (not more than one at a time), then the preceding example would not require the for (;;) if (member( . . . ) ) loop and test, and would require only a switch ( ) { } on the type portion of the exception value.

APPENDIX C

GENERIC EXCEPTION HANDLER CODE
FILE NAME: EXCEPTION.C

```
#include <stdio.h>
#include "exception.h"
/*
 * generic exception handler
 */
static char *ex_class_str [ ] = {
    0,
    "SETUP",
    "OPERATION",
    "VERIFY",
    "ARGUMENT",
    "PROGRAM",
    0
};
static char *setup_type_str [ ] = {
    "INC_TEST_PARAMS",
    "CONDITION_CLASH",
    "CONDITION_FAILURE",
    "ERROR_DURING_SETUP",
    "INVALID_SETUP_PARAM",
    0
};
static char *operation_type_str [ ] = {
    "PRIV_BRACKET",
    "CANT_HAPPEN",
    0
};
static char *verify_type_str [ ] = {
    "NOT_EXPECTED_ERROR",
    "ERROR_NOT_EXPECTED",
    "SUCCESS_NOT_EXPECTED",
    "NOT_EXPECTED_RESULT",
    "ERROR_DURING_VERIFY",
    "ERROR_AS_EXPECTED",
    "SUCCESS_AS_EXPECTED",
    0
};
static char *arg_type_str [ ] = {
    0
};
static char *test_prog_type_str [ ] = {
    "ERROR_DURING_AUX",
    "TEST_CASE_FAILURE",
    0
};
static char **ex_type_strs [ ] = {
    0,
    setup_type_str,
    operation_type_str,
    verify_type_str,
    arg_type_str,
    test_prog_type_str,
    0
};
static char *
ex_type_str (cp, t)
    char **cp;
    int t;
{
    for ( ; t && *cp; t >>= 1, cp++)
        if (t&1)
```

APPENDIX C-continued

GENERIC EXCEPTION HANDLER CODE
FILE NAME: EXCEPTION.C

```
            return (*cp) ;
        return ("UNDEFINED") ;
}
void
excp_gh (e)
    int e;
{
    fprintf (stderr, "EXCEPTION at \"%s\", line %d:%s",
        excp_file, excp_line,
        /* replace the next line as approp from those below */
        " ") ;
/* use this to start a new line for the class when a type is present
        EX_TYPE(e) ? " \nEXCEPTION " : " ") ;
*/
/* use this to start a new line for the class always
        " \nEXCEPTION ");
*/
/* use this to NOT start a new line for the class
        " ");
*/
    switch (EX_CLASS(e)) {
        int i;
    case EXC_SETUP:
    case EXC_OPERATION:
    case EXC_VERIFY:
    case EXC_ARG:
    case EXC_PROGRAM:
        break;
    default:
        fprintf (stderr, "Class UNKNOWN (%d)\n", EX_CLASS(e)) ;
        return;
    }
    fprintf (stderr, "Class %s",ex_class_str [EX_CLASS(e)]);
    if (EX_TYPE(e))
        fprintf (stderr, ", Type %s",
            ex_type_str(ex_type_strs[EX_CLASS(e)],EX_TYPE(e)));
    fprintf (stderr, "\n") ;
}
```

APPENDIX D

EXAMPLE OF AN EMBODIMENT OF EXCEPTION HANDLER
INVENTION DEMO_EXCEPTION.C FILE

```
#include "stdio.h"
#include "exception.h"
/*
 * This demo program wants exactly one argument,
 * which is the letter 'a'.
 * If there is no argument a SETUP exception is raised.
 * If it is not an 'a' the ARG exception is raised.
 * If there is an 'a' argument but there is also an
 * extra argument a VERIFY exception is raised.
 */
int h (e) int e; {
    excp_gh (e) ; /* just call the generic handler */
}
main(argc, argv) int argc; char **argv; {
    INIT_EXCEPTION;
```

APPENDIX D-continued

EXAMPLE OF AN EMBODIMENT OF EXCEPTION HANDLER INVENTION DEMO_EXCEPTION.C FILE

```
ON_EXCEPTION_H (EXC_SETUP,h) {
    if ( argc < 2 ) {
        RAISE_EXCEPTION (EXC_SETUP) ;
    }else{
        ON_EXCEPTION_H(EXC_ARG,h) {
            func1 (argc, argv) ;
        }EX_END;
    }
}EX_END;
}
func1 (n, v) int n; char **v; {
func2 (n, v) ;
if ( n > 2 )
```

APPENDIX D-continued

EXAMPLE OF AN EMBODIMENT OF EXCEPTION HANDLER INVENTION DEMO_EXCEPTION.C FILE

```
        RAISE_EXCEPTION(EXC_PROGRAM) ;
}
func2 (m, a) int m; char **a; {
    if( *a[1] != 'a' ) {
        RAISE_EXCEPTION(EXC_ARG) ;
    }else{
        printf ("OK\n") ;
    }
}
```

APPENDIX E

FILE: DEMO_EXCEPTION.I.REFORMATED
OUTPUT OF "C" PREPROCESSOR OPERATING ON DEMO CODE

```
extern      struct        _iobuf {
    int      _cnt;
    unsigned char *_ptr;
    unsigned char *_base;
    int      _bufsize;
    short    _flag;
    char     _file;
} _iob [ ] ;
extern struct _iobuf *fopen ( ) ;
extern struct _iobuf *fdopen ( ) ;
extern struct _iobuf *freopen ( ) ;
extern struct _iobuf *popen ( ) ;
extern struct _iobuf *tmpfile ( ) ;
extern long    ftell ( ) ;
extern char    *fgets ( ) ;
extern char    *gets ( ) ;
extern char    *sprintf ( ) ;
extern char    *ctermid ( ) ;
extern char    *cuserid ( ) ;
extern char    *tempnam ( ) ;
extern char    *tmpnam ( ) ;
typedef        int jmp_buf [9] ;
typedef        int sigjmp_buf [9+1] ;
int      setjmp ( ) ;
int      _setjmp ( ) ;
int      sigsetjmp ( ) ;
void     longjmp ( ) ;
void     _longjmp ( ) ;
void     siglongjmp ( ) ;
#pragma unknown_control_flow(sigsetjmp, setjmp, _setjmp)
extern int errno;
int exception_initialized;
int ex_envptr;
jmp_buf ex_envstack [20] ;
char *excp_file;
int excp_line;
int excp_errno;
void excp_gh( ) ;
int h (e) int e; {
    excp_gh (e) ;
}
main (argc, argv) int argc; char **argv; {
    { int v;
        if( v = setjmp(ex_envstack [ex_envptr = 0]) ) {
            excp_gh(v) ; errno = 0;
            fprintf((&_iob[2]) , "UNHANDLED EXCEPTION (last exception reported)\n") ;
            exit (1) ;
        }
        else { ex_envptr++; exception_initialized = 1; }
    };
    for (; ;) { int ex_val; if( ex_val = setjmp ( ex_envstack [ex_envptr++] )
) {
```

APPENDIX E-continued

FILE: DEMO_EXCEPTION.I.REFORMATED
OUTPUT OF "C" PREPROCESSOR OPERATING ON DEMO CODE

```
            if ( 1 == ((ex_val) & 0xFFFF) ) { (*h) (ex_val) ; break; }
            else longjmp (ex_envstack [--ex_envptr] , ex_val) ; }else{{
                if( argc < 2 ) {
                    { excp_file = "demo_exception.c"; excp_line = 23;
                      excp_errno = errno;
                      longjmp ( ex_envstack [--ex_envptr], 1 ) ;
                    } ;
                } else{
                    for (;;) {
                        int ex_val;
                        if ( ex_val = setjmp ( ex_envstack [ex_envptr++]
) ) {
                            if ( 4 == ((ex_val) & 0xFFFF) ) {
(*h) (ex_val) ; break; }
                            else longjmp (ex_envstack [--
ex_envptr] , ex_val) ;
                        }else {{
                            func1 (argc, argv) ;
                        }} ex_envptr--; break; };
                    }
                }} ex_envptr--; break; };
}
func1 (n, v) int n; char **v; {
    func2 (n, v) ;
    if ( n > 2 )
        { excp_file = "demo_exception.c"; excp_line = 36;
          excp_errno = errno;
          longjmp ( ex_envstack [--ex_envptr] , 5 ) ;
        };
}
func2 (m, a) int m; char **a; {
    if( *a [1] != 'a' ) {
        { excp_file = "demo_exception.c"; excp_line = 41;
          excp_errno = errno;
          longjmp( ex_envstack [--ex_envptr] , 4 ) ;
        };
    }else{
        printf ("OK\n") ;
    }
}
```

What is claimed is:

1. A method of exception handling for selected software code, comprising:

enclosing first selected software code with a first exception construct, the first selected software code having a selected first corresponding lexical code scope and a first corresponding dynamic code scope;

raising an exception within said first exception construct by invoking a particular exception handler which does not return a value to the first selected software code and wherein the raised exception is from a particular verification class;

wherein the first corresponding lexical code scope executes entirely within the lexical code scope and the first corresponding dynamic code scope executes entirely within the dynamic code scope; and wherein the execution of the first selected software code while enclosed by the first exception construct executes in a manner uneffected by the first exception construct.

2. The method according to claim 1, including enclosing at least a portion of said first selected software code with a second exception construct.

3. The method according to claim 2, including determining whether said exception can be handled in accordance with said second exception construct.

4. The method according to claim 3, including handling said exception in accordance with said first exception construct.

5. The method according to claim 3, including raising said exception within code called from within the lexical code scope of said exception construct.

6. The method according to claim 3, including reporting of an exception which is not capable of being handled.

7. The method according to claim 6, wherein said reporting includes providing a file name and line number associated with the exception.

8. The method according to claim 3, including reraising said exception if it cannot be handled in accordance with said second exception construct.

9. The method according to claim 1, wherein said exception is raised within the lexical code scope of said first exception construct.

10. An exception construct for handling exceptions within selected software code, comprising:

a first exception wrapper for defining a first lexical code scope and a first dynamic code scope with respect to a first selected portion of selected software code; wherein the selected software code is wrapped with the first exception wrapper;

a class of exceptions wherein a particular exception is raised within the first exception wrapper by invoking a particular exception handler which does not return a value to the selected software code;

the first lexical code scope executing entirely within the lexical code scope and the dynamic code scope executing entirely within the dynamic code scope; and such that the selected software code while wrapped by the first exception wrapper executes in a manner unaffected by the first exception wrapper.

11. The exception construct according to claim 10, comprising RAISE_EXCEPTION code within the dynamic scope of said first exception wrapper.

12. An exception construct according to claim 11, further comprising a second exception wrapper within said first exception wrapper, for defining a second lexical code scope and a second dynamic code scope with regard to a second selected portion of software code within said first selected portion of software code.

13. An exception construct according to claim 10, wherein said exception wrapper includes an opening expression and a closing expression, defining the lexical scope of protected software.

14. An exception construct according to claim 10, further comprising an exception handling function for handling exceptions raised within said first exception wrapper, which cannot be handled in accordance with said first exception construct.

15. A computer program product comprising:
- a computer usable medium having a computer readable program code means embodied therein for causing the structured handling of exceptions encountered during program execution, the computer program product comprising:
  - a first computer readable code construct configured to enclose a first selected software code with a first exception construct, the first selected software code having a selected first corresponding lexical code scope and a first corresponding dynamic code scope;
  - a second computer readable code construct configured to raise an exception within said first exception construct by invoking a particular exception handler which does not return a value to the first selected software code and wherein the raised exception is from a particular verification class;
  - wherein the first corresponding lexical code scope executes entirely within the lexical code scope and the first corresponding dynamic code scope executes entirely within the dynamic code scope; and
  - wherein the execution of the first selected software code while enclosed by the first exception construct executes in a manner uneffected by the first exception construct.

16. The computer program product according to claim 15, further comprising:
- a computer readable code construct configured to raise an exception within said selected computer code.

17. A computer program product according to claim 15, further comprising a second computer readable code construct within said first computer readable code construct, configured to wrap a selected portion of said selected computer code for selected exception handling protection.

18. A computer program product according to claim 15, comprising:
- computer readable code configured to handle exceptions not handleable according to said first computer readable code construct.

19. A computer program product according to claim 15, wherein said first computer readable code construct is configured as an expandable C macro expressed to cause a C preprocessor to expand said first computer readable code construct in accordance with a predetermined macro definition.

* * * * *